United States Patent [19]

Kaplanis

[11] Patent Number: 4,558,663
[45] Date of Patent: Dec. 17, 1985

[54] SAFETY DEVICE FOR CHOKER-COLLAR

[76] Inventor: John N. Kaplanis, 2916 Brierdale La., Bowie, Md. 20715

[21] Appl. No.: 684,137

[22] Filed: Dec. 20, 1984

Related U.S. Application Data

[63] Continuation-in-part of Ser. No. 630,828, Jul. 13, 1984, abandoned.

[51] Int. Cl.4 .............................................. A01K 27/00
[52] U.S. Cl. .................................. 119/106; 24/116 R
[58] Field of Search ............ 119/106, 109; 24/116 R, 24/115 H; 63/4

[56] References Cited

U.S. PATENT DOCUMENTS

| | | | |
|---|---|---|---|
| 229,257 | 6/1880 | King | 24/116 R |
| 1,891,947 | 12/1932 | Powell | 24/115 H |
| 2,259,059 | 10/1941 | Better | 24/116 R |
| 2,586,758 | 2/1952 | Zerr | 24/116 R |
| 2,861,313 | 11/1958 | Ruff | 24/115 H |
| 3,701,339 | 10/1972 | Kemmerling | 24/115 H |
| 3,974,545 | 8/1976 | Lossini | 24/116 R |
| 4,049,357 | 9/1977 | Hamisch, Jr. | 24/115 H |

Primary Examiner—Jay N. Eskovitz
Attorney, Agent, or Firm—Morris Kaplan

[57] ABSTRACT

A safety device for attachment to the free-riding ring of a choker-chain or collar to be worn by an animal is in an openable container configuration that is dimensioned to receive said ring and has a slotted wall adapted to accommodate the cross-sectional extent of the collar length. A tubular element contained within the safety device passes through and further secures said ring. Optionally, a plurality of spaced slotted wall means are adapted to assemble the device to the collar whereby the device may be stored at an intermediate section of the collar length when the free-riding ring is to be leashed. The contained parts may be unitarily hinged. One type of hinge is an elongated and apertured strap whereby the device may be slidably mounted on said collar length.

12 Claims, 8 Drawing Figures

SAFETY DEVICE FOR CHOKER-COLLAR

This application is a continuation-in-part of application Ser. No. 06/630,828, filed July 13, 1984 now abandoned.

TECHNICAL FIELD

The present invention relates to the safeguarding of animals and particularly to a device for enclosing, and locking about, the running end of a dog's choker-chain or collar.

BACKGROUND OF THE INVENTION

The use of a choker-chain or collar is well known in the art of animal handling. It is especially associated with dog-training but is often relied on as an everyday accessory and, in the case of the larger and/or temperamental dog, may indeed be requisite to at least adequate control of the animal.

It is not uncommon that the ring comprising the live or running end of the choker-collar provides the primary hazard through which the animal is severely or fatally injured.

Even when the choker-collar is properly fitted and has the proper hand or construction, so that by gravity the collar opens to its largest diameter with the running and stationary rings being relatively close to the animal's body, the ring at the live or running end of the collar presents a hazardous situation. Such a free-riding ring element may easily snag itself so that the collar then tightens with consequent severe or fatal injury to a panic-stricken animal attempting to free itself or to an animal propelling itself with force and stopped in mid-stride.

Such peril attendant use of the choker-collar has been recognized; see for instance the U.S. Pat. No. 3,701,339 to Kemmerling, issued Oct. 31, 1972, wherein a sleeve member is slidable to a position overlying the ring at the running end of a choke-collar. However, it is pointed out that patentee's sleeve member is not a reliable improvement since said member neither incorporates means whereby to be fixed in the safeguard position nor any means to inhibit sliding thereof to a ring-open location.

SUMMARY OF THE INVENTION

The present invention is directed to a novel and improved means for safeguarding an animal, as for instance a dog, by a safety-oriented choker-chain or collar.

It is an object of this invention that the novel and improved safety means be an appurtenance that is either slidably mounted on or separable from a choke-chain or collar.

It is a further object of the invention that the novel and improved safety device be reusable and be adapted to enclose and lock about the ring at the running end of a choker-chain or collar.

It is a further object of the invention that the novel and improved safety device be simple to use, uncomplicated in structure, pleasing in design, inexpensive and easy to manufacture, and fabricated of conventional materials.

For a more fully developed presentation of the present invention, and preferred embodiments thereof, reference is made to the following descriptive matter and attached drawings.

DETAILED DESCRIPTION OF THE INVENTION

Figure 1:
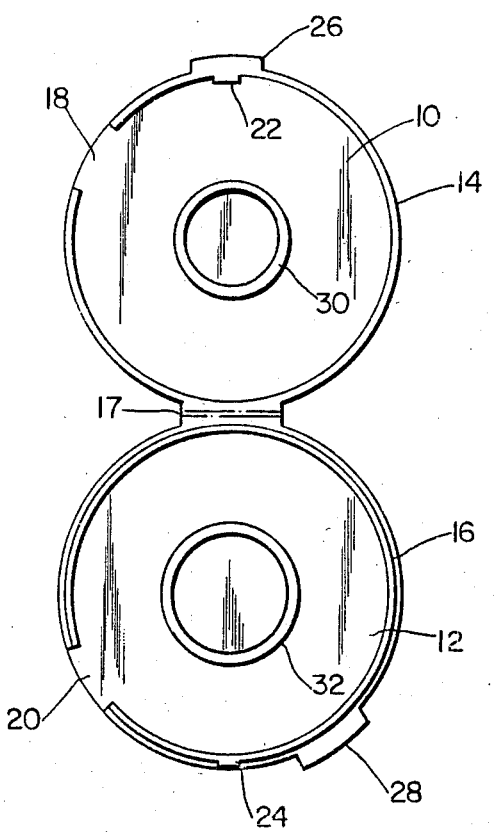
FIG. 1 is a plan view of a first embodiment of the safety device of the invention.

Referring to the drawings which illustrate preferred embodiments of the invention and wherein like numerals indicate like elements of structure, there is shown in FIG. 1 the innerside of the safety device in open position. The device presents a container-like configuration having a first plate member 10, a second plate member 12 and respective skirts 14, 16 therewith. The skirts are hingedly connected at the free edges thereof, along a bend or flex line 17; include respective slots 18, 20 which each extend from a free skirt edge and are aligned with and complement each other when the described device parts are disposed in a closed relationship; and further incorporate locking means, as for instance conventional snap fastener means 22, 24 and manipulating flanges 26, 28.

Centrally disposed on the inner face of each member 10, 12 is an opposed one of preferably resilient tubular elements 30, 32; the element 30 having a telescopic fit in element 32. A yieldable tight fit is disclosed for securing and locking the telescoping tubular parts. It is obvious, however, that the tubular elements may be secured by other conventional means; as for instance by a snap fit and lock means illustrated by a bead ring disposed on the outer surface of tubular element 30 and a mating ring groove located in the inner surface of the tubular element 32. It is further obvious that the safety device could be provided with but a single one of said locking means instead of the aforedescribed dual means or with a bayonet joint locking means if the parts are untethered.

To facilitate registration of the mating parts and closing of the device, the tubular element 30 is chamfered at its free outer edge, and/or the tubular element 32 is beveled at its free inner edge. Such expediencies for the aligning, mating and locking are notoriously old and commonplace in the arts and therefore not illustrated herein.

In use, the free-riding ring of a choke-chain or collar is simply placed over one of the tubular elements while the collar length 34 is positioned to extend through the associated slot element. The tubular elements are then operatively associated, and the skirted members 10, 12 are merely finger pressured to a fully closed position to engage the aforesaid snap fastener and bead and groove locking means.

A positive closing of the safety device has thus been effected, and the animal can now move about freely; at least to the extent that the ring portion of the choke-collar will not directly hook and snag itself.

Figure 3:
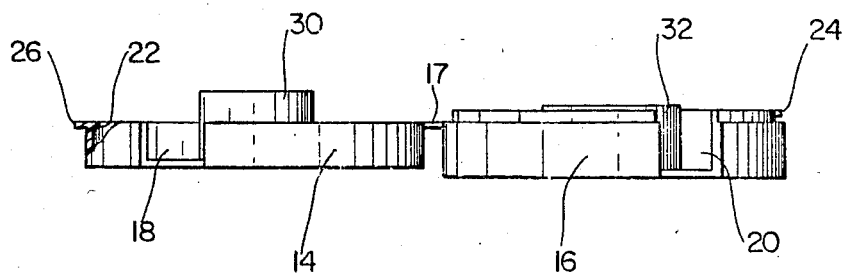
FIG. 3 is a longitudinal elevation of the safety device of FIG. 1.
Figure 4:
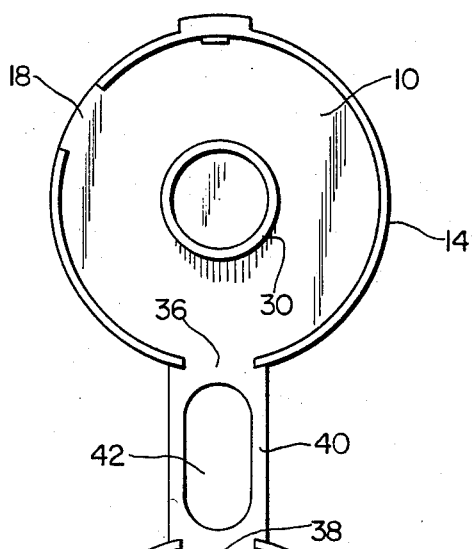
FIGS. 4 and 5 are a respective plan and perspective views of a second embodiment of the invention.
Figure 5:
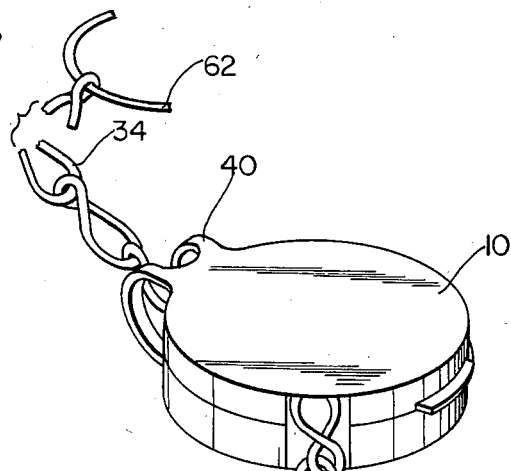

A second preferred embodiment of the invention is disclosed in FIGS. 4 and 5 wherein the aforedescribed structure is substantially duplicated and materially differs only by inclusion of a second pair of complementary and aligned slots 36, 38 in the respective skirts 14, 16; elongation of the hinge element to form for instance strap 40 having aperture 42 therein; and tethering the plates by forming the strap integral therewith instead of connecting the skirts as shown in FIG. 3. Slots 36, 38 and aperture 42 are also dimensioned to accommodate the cross-sectional extent of the choker-collar length and preferably are in alignment.

Figure 2:
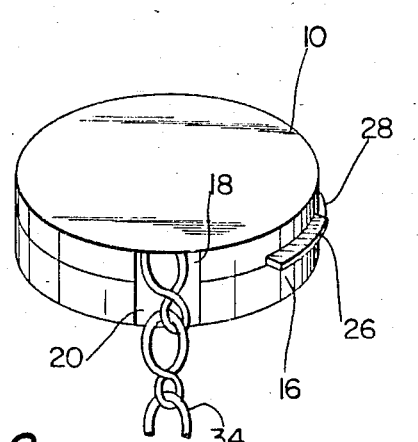
FIG. 2 is a perspective view of the safety device of FIG. 1 in assembly with a collar member.

By operatively associating the collar length with the plurality of slots and the apertured strap, as best illustrated in FIG. 5, the safety device may now slide between a storage position remote from the free-riding ring, as further illustrated in FIG. 5, and a functional safety location encompassing said ring in a manner illustrated in FIG. 2. Strap 40 may be of resilient material and aperture 42 of a size forceable over an end ring 60, 62 whereby the safety device may be retained in assembly with the choker collar.

Figure 6:
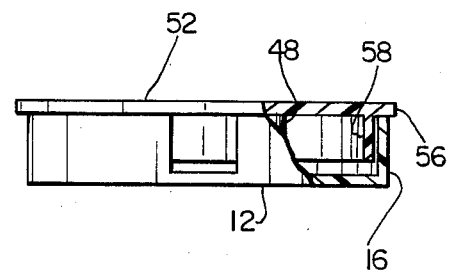
FIGS. 6, 7, and 8 illustrate a third embodiment of the invention.
Figure 7:
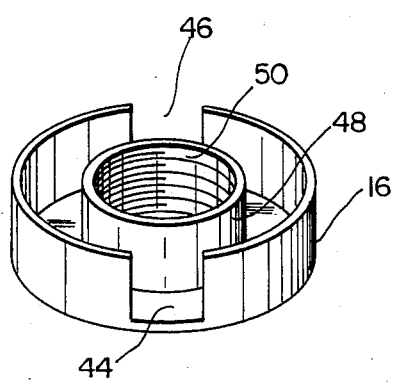
Figure 8:
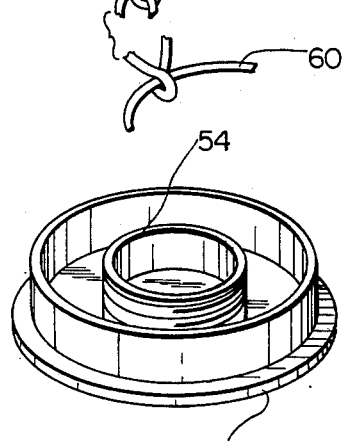

A third preferred embodiment of the invention, FIGS. 6, 7, 8, provides the skirt 16 with spaced open-ended slots 44, 46, which may be variously located as for instance illustrated in FIG. 4, and an internally screw threaded tubular element 48, 50 that is co-extensive with skirt 16.

A plate 52, which corresponds to the above-recited plate 10, is for manipulative purposes dimensioned to extend beyond skirt 16; has an externally screw threaded tubular element 54, 56 which corresponds to tubular element 30 in FIGS. 1, 3; and has a flexible or resilient continuous skirt member 58 that is spaced from the periphery thereof, is preferably slidably telescopic in skirt 16 and extends to a length whereby being adapted to substantially bear against a collar portion associated with plate 12 and slots 44, 46 to thereby enhance locking of the device to the choker-collar; especially in the case of the safety device whose closing-locking means otherwise comprise only threaded ones of the said telescoping tubular parts whereat the threads of which a reactive bearing force would be exerted. The edge 56 of plate 52 may be knurled or scalloped or the like to facilitate manipulation.

Although the invention is illustrated by generally annular configurations, it is obvious that in the case of a push-pull operation, that the device may be variously configured for any reason of expedient handling, manufacture or aesthetic quality.

Further, the embodiments of FIGS. 1-5 may be operative with either a single pair of or plural pairs of slot formations; may be adapted with but a single skirted plate that associates with an unskirted plate; and may be adapted to function with only a single extended tubular element in the case of dual skirted plates.

The device can also be fabricated without any tubular element but elimination thereof would result in loss of strength, rigidity, and ring securement.

The embodiments shown and described are only illustrative of the present invention and are not to be construed as being delimitive thereof, since once apprised of the invention, changes in structure would be readily apparent to one skilled in the art. Hence, the present invention includes all modifications of structure encompassed within the spirit and scope of the following claims.

I claim:

1. A safety device for attachment to the free riding ring of a choker-collar to be worn by an animal comprising:

a first plate member having a first skirt extending from the periphery of the inner surface thereof;

a second plate member separable from and adapted to associate with said skirt to form a container of a size to receive said free riding ring therein;

a respective one of telescopically engagable tubular elements centrally integral with the inner surface of each plate member;

said tubular elements being dimensioned to accommodate said running ring thereabout;

a first open-ended slot extending from the skirt periphery and adapted to accommodate therein an intermediate section of said choker-collar; and the operatively associated faces of said tubular elements being fabricated from a resilient material and configured to form releasable locking means when telescoped;

whereby the safety device may be releasably locked, in container form, by means of engagement of said telescoped tubular elements to thereby be closed upon a free-riding ring that is seated about the tubular element with the length of the choker-collar extending through said slot and to the wearer animal to thereby prevent said ring from directly snagging itself to the animal's peril.

2. A safety device as in claim 1 wherein the plate members are hingedly integral.

3. A safety device as in claim 1 wherein said association of the second plate member with the skirt comprises a further skirt element that extends from the second plate member to associate with said first skirt to form said container and said further skirt has an open ended slot therein that is complementary to and is aligned with the first open-ended skirt.

4. A safety device as in claim 1 wherein a second open-ended slot extends from the skirt periphery and is adapted to accommodate therein an intermediate section of said choker-collar;

whereby when it is desired to attach a leash to said ring, the safety device is adapted to have an intermediate section of the collar length fitted in and through said slots to allow closure of the safety device in storage location on said collar.

5. A safety device as in claim 4 wherein means in operative alignment with said second slot, hingedly connects said plates and is structurally adapted to accommodate therethrough an intermediate section of said choker-collar whereby the safety device is adapted to be held captive on a said choker-collar.

6. A safety device for attachment to the free-riding ring of a choker-collar to be worn by an animal comprising:

a first plate member having a skirt extending from the inner periphery thereof;

a second plate member separable from and adapted to operatively associate with said skirt to thereby form a container;

a first pair of spaced, open-ended slots extending from the periphery of said skirt;

means formed integral with said device to secure said plate members in closed container configuration;

said container configuration being dimensioned to accommodate therein the free-riding ring of a choker-collar worn by an animal; and said slots being dimensioned to accommodate therethrough the cross-sectional extent of the collar length extending from said free-riding ring;

whereby the safety device when closed, secured and having the free riding choker-collar ring therein prevents said ring from directly snagging itself to the animal's peril;

whereby when it is desired to attach a leash to said ring, the safety device is adapted to have an intermediate section of the collar length fitted in and through said slots to allow closure of the safety device into storage location on said collar;

strap means hingedly connecting said plates;

an aperture formed in said strap means; and said aperture being in operative alignment with one of said slots and dimensioned to accommodate therethrough an intermediate section of the choker-collar;

whereby said strap aperture and slots adapt the safety device to be held captive on said choker-collar during movement between aforedescribed securement to the free-riding ring and securement at storage location.

7. A safety device as in claim 6 wherein:

at least one tubular element is centrally integral with the inner surface of one of said plate members;

said tubular element being dimensioned to accommodate, by fitting through, said ring when in the secured container-like safety device; and said tubular element extending at least substantially fully between said plates whereby to further secure the ring in the closed device.

8. A safety device as in claim 6 wherein:

a respective one of telescopically engagable tubular elements is centrally integral with the inner surface of eah plate member;

said tubular elements are dimensioned so as to accommodate thereabout and further secure said ring in the closed device; and the operatively associated faces of said tubular elements being fabricated of a resilient material and configured to form, when telescoped, said means to secure the plate members in closed container configuration.

9. A safety device as in claim 6 wherein a respective one of telescopically engagable tubular elements extend centrally from the inner surface of each plate member;

said tubular elements being of a resilient material and dimensioned to accommodate said running rings thereabout; and the operatively associated faces of said tubular elements being configured to form, when telescoped, said means to secure the plate members in closed container configuration.

10. A safety device for attachment to the free-riding ring of a choker-collar to be worn by an animal comprising:

a first plate member having a skirt extending from the inner periphery thereof;

a second plate member separable from and adapted to operatively associate with said skirt to thereby form a container of a size adapted to contain therein the free-riding ring;

an open-ended slot extending from the periphery of said skirt and dimensioned to accommodate therethrough the cross-sectional extent of the collar length extending from said free-riding ring to be contained in said container;

threaded means formed integral with said device to secure said plate members in closed container configuration;

whereby the safety device when closed, secured end containing therein the free-riding ring of a choker collar worn by an animal prevents said ring from directly snagging itself to the animal's peril;

said second plate member having depending therefrom, a continuous skirt that is telescopically associated with the slotted skirt and uniformly extends over the width of the slot and overlaps in part the open-ended slot; and at least the free periphery of said continuous skirt being flexible in character;

whereby with the safety device closed as aforedescribed, the flexible skirt periphery is adapted to bear against the choker-collar section extending through the slot to thereby exert a reactive bearing force at the threads of said securing means to enhance locking of the assembled plate members.

11. A safety device as in claim 10 wherein a second open-ended slot extends from the periphery of said first plate member skirt;

whereby when it is desired to attach a leash to said ring, the safety device is adapted to have an intermediate section of the collar length fitted in and through said slots to allow closure of the safety device in storage location on said collar.

12. A safety device as in claim 10 wherein a respective one of telescopically engagable tubular elements extend centrally from the inner surface of each plate member;

said tubular elements being dimensioned to accomodate said running ring thereabout; and the operatively associated faces of said tubular elements being configured to form, when telescoped, said threaded means to secure the plate members in closed container configuration.

* * * * *